(12) United States Patent
Lichti et al.

(10) Patent No.: US 12,397,443 B2
(45) Date of Patent: Aug. 26, 2025

(54) ROBOTICS CONTROL AND SENSING SYSTEM AND METHOD

(71) Applicant: 11712381 Canada Corporation, Waterloo (CA)

(72) Inventors: Tim Lichti, Waterloo (CA); Marcus Lechner, Richmond Hill (CA)

(73) Assignee: 11712381 Canada Corporation

( * ) Notice: Subject to any disclaimer, the term of this patent is extended or adjusted under 35 U.S.C. 154(b) by 314 days.

(21) Appl. No.: 17/976,446

(22) Filed: Oct. 28, 2022

(65) Prior Publication Data

US 2023/0135039 A1 May 4, 2023

Related U.S. Application Data

(60) Provisional application No. 63/273,456, filed on Oct. 29, 2021.

(51) Int. Cl.
*B25J 13/08* (2006.01)
*B25J 9/16* (2006.01)

(52) U.S. Cl.
CPC .......... *B25J 13/085* (2013.01); *B25J 9/1674* (2013.01)

(58) Field of Classification Search
CPC ...... B25J 13/085; B25J 9/1674; B25J 13/081; G05B 2219/39212; G05B 2219/40153
See application file for complete search history.

(56) References Cited

U.S. PATENT DOCUMENTS

| | | | | |
|---|---|---|---|---|
| 9,499,219 | B1* | 11/2016 | Jackowski | B25J 9/1694 |
| 10,824,159 | B2* | 11/2020 | Bautista | G01L 1/122 |
| 2006/0000122 | A1* | 1/2006 | Micozzi | E01H 5/063 37/232 |
| 2013/0232827 | A1* | 9/2013 | Summers | E01H 5/062 37/274 |
| 2017/0095925 | A1* | 4/2017 | Yamane | B25J 9/1633 |
| 2020/0070342 | A1* | 3/2020 | Hannya | B25J 9/1633 |
| 2020/0081447 | A1* | 3/2020 | Bautista | G01L 1/12 |
| 2020/0337208 | A1* | 10/2020 | Hertzog | A01B 63/004 |
| 2021/0285171 | A1* | 9/2021 | Weihl | E01H 5/067 |
| 2022/0074155 | A1* | 3/2022 | Hoffman | E01H 5/065 |

* cited by examiner

*Primary Examiner* — Thomas E Worden
*Assistant Examiner* — Madison B Emmett

(57) ABSTRACT

Computing platforms, methods, and storage media for sensing and controlling with respect to a robot. A robot control and sensor system may include a pressure sensor configured to be mounted on a robot, and/or mounted on a robot peripheral, to measure a sensed pressure value at the robot. The pressure sensor operates with respect to first and second pressure thresholds. A controller is in communication with the pressure sensor and may be configured to: obtain, from the pressure sensor, a sensed pressure value relating to pressure applied to the robot at the pressure sensor; generate a soft reset notification to cause the robot to enter a soft reset mode when the sensed pressure value is above the first pressure threshold; and generate a hard reset notification to cause the robot to enter a hard reset mode when the sensed pressure value is above the second pressure threshold.

11 Claims, 3 Drawing Sheets

ROBOTICS CONTROL AND SENSING SYSTEM AND METHOD

FIELD

The present disclosure relates to robotics, including but not limited to a system, computing platform, method, and storage media for robotics control and sensing.

BACKGROUND

Robotics systems and robots are used in a number of different implementations. In many cases, a robot may encounter an adverse condition while performing robotic functions for which it has been designed. Examples of such an adverse condition include coming into contact with an object or a surface that restricts or prevents robot movement along a desired path.

For a robot operating in an autonomous mode, it can be desirable to have the ability to control the robot when the robot encounters an adverse condition. For example, if a robot is no longer able to perform its functions due to an adverse condition, continued operation of the robot may cause short-term or long-term damage to the robot. A robot may employ one or more sensors to assist in identifying whether the robot has encountered an adverse condition.

Improvements in approaches for controlling a robot are desirable.

BRIEF DESCRIPTION OF THE DRAWINGS

Embodiments of the present disclosure will now be described, by way of example only, with reference to the attached Figures.

DETAILED DESCRIPTION

Figure 1:
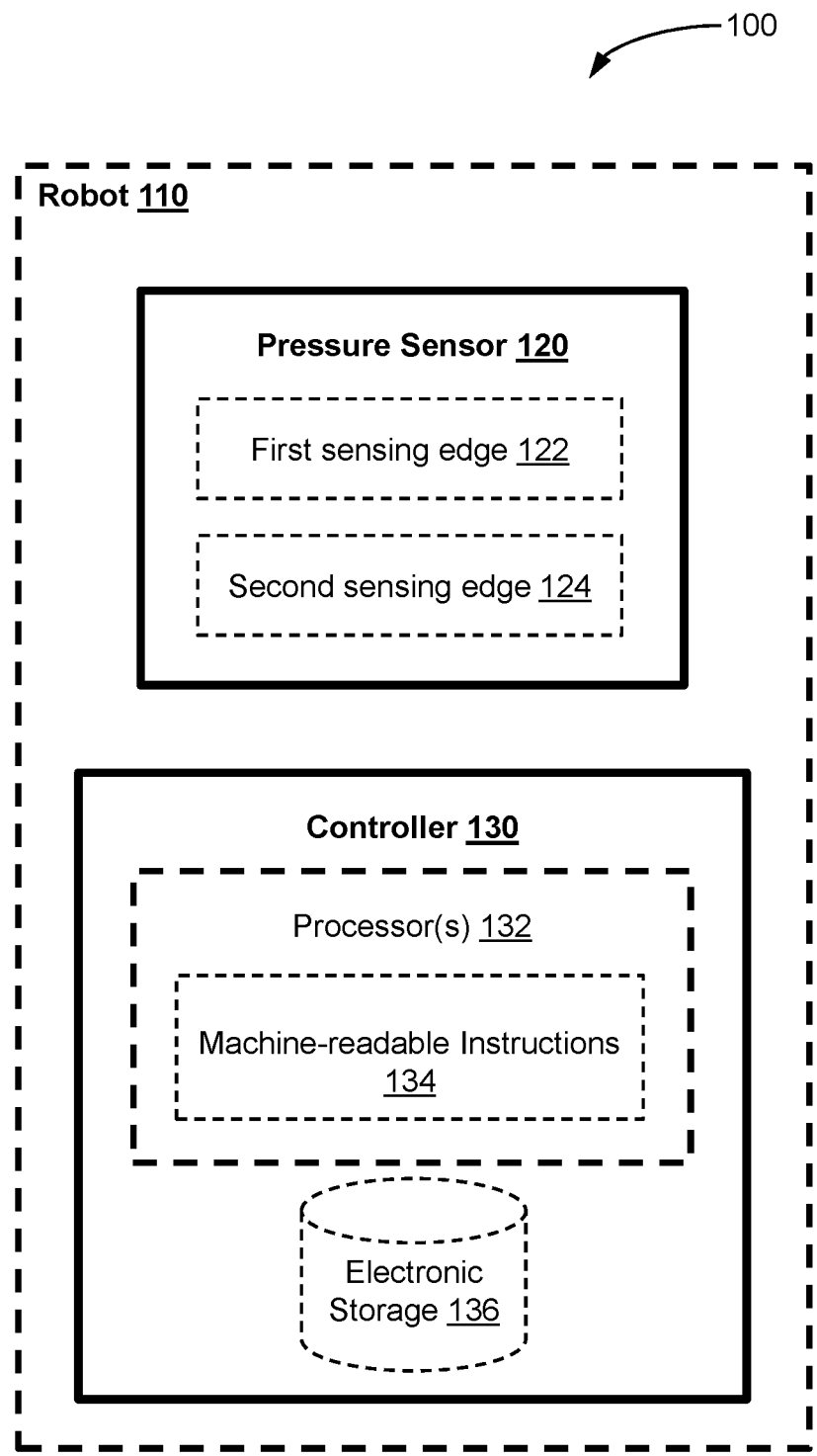
FIG. 1 illustrates a robot control and sensor system, in accordance with one or more embodiments.

Computing platforms, methods, and storage media are provided for sensing and controlling with respect to a robot. A robot control and sensor system may include a pressure sensor configured to be mounted on a robot and/or mounted on a robot peripheral, such as a lawn cutting deck or a snow plow, and to measure a sensed pressure value at the robot and/or peripheral. The pressure sensor operates with respect to first and second pressure thresholds. A controller is in communication with the pressure sensor and may be configured to: obtain, from the pressure sensor, a sensed pressure value relating to pressure applied to the robot at the pressure sensor; generate a soft reset notification to cause the robot to enter a soft reset mode when the sensed pressure value is above the first pressure threshold; and generate a hard reset notification to cause the robot to enter a hard reset mode when the sensed pressure value is above the second pressure threshold.

In an example embodiment, the present disclosure provides a robot control and sensing system including a double sensing edge. In an example implementation, the double sensing edge includes a first sensing edge requiring a lighter touch and causing or enabling a "soft" reset of the robot, which can be reversed by a remote guardian or tele-operator. The double sensing edge may include a second sensing edge requiring a harder touch and causing or enabling a hard reset of the robot, which needs to be physically reset and cannot be performed remotely.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

FIG. 1 illustrates a robot control and sensor system 100, in accordance with one or more embodiments, for operation in relation to a robot 110. A robot may be any simple or complex robotics system configured for either indoor or outdoor use. For example, the robot may include a single-use or multi-use robot for snow clearing and/or grass cutting. In an example implementation, the robot is configured to operate in an autonomous mode, which may be a normal operational mode. The robot may also be configured to operate in a tele-operator mode and/or in a mode in which a remote guardian may observe robot operation and/or intervene with robot operation.

The system 100 includes a pressure sensor 120 configured to be mounted on the robot 110 and to measure a sensed pressure value at the robot. The pressure sensor 120 operates with respect to a first pressure threshold and with respect to a second pressure threshold. The second pressure threshold may be higher than the first pressure threshold. In an example embodiment, the pressure sensor 120 comprises a double sensing edge configured to sense pressure with respect to a first pressure threshold and a second pressure threshold. The pressure sensor 120 may be mounted directly on the robot 110. The pressure sensor 120 may be mounted indirectly on the robot 110, for example mounted on a robot peripheral attached to the robot. One or more pressure sensors 120 may be mounted on the robot 110 and/or on a robot peripheral attached to the robot 110.

The system 100 comprises a controller 130. The controller 130 is in communication with the pressure sensor 120 and may be configured to obtain, from the pressure sensor 120, a sensed pressure value relating to pressure applied to the robot at the pressure sensor. The controller 130 may be configured to generate a soft reset notification to cause the robot to enter a soft reset mode when the sensed pressure value is above the first pressure threshold.

The controller 130 may be configured to restrict robot movement in the soft reset mode, optionally permitting only certain minor movements. The controller 130 may be configured to prevent robot movement in the soft reset mode. The controller 130 may be configured to cause the robot to enter the soft reset mode in which robot movement is restricted and remote guardian access to the robot is enabled when the sensed pressure value is above the first pressure threshold. Embodiments of the present disclosure use a sensed pressure value to enable the robot to operate in a soft reset mode, rather than known approaches of either permitting full operation or preventing operation altogether.

The soft reset mode may be advantageous by permitting the robot to remain operational, with restricted movement, for example until an operator may be able to investigate the cause of the pressure and any associated consequences. For example, if a robot gently hit a wall, in the soft reset mode a tele-operator may be able to determine whether the robot is fit to be placed back into service, whether the robot needs to be re-oriented or an obstacle needs to be cleared, or whether maintenance is required. In an example implementation, the system may comprise a camera or a diagnostic system configured to observe components of the robot in response to the sensed pressure and determine a status of the observed components, and provide an indication to a tele-operator.

In another embodiment, when the soft reset mode has been triggered, for example in response to the sensed pressure exceeding the first pressure threshold, the controller 130 may be configured to instruct the robot perform one or more actions even before a remote guardian or tele-operator takes further manual control. In an example implementation, the one or more actions may comprise slowly moving the robot a few inches in the opposite direction of the sensor that was triggered. In an example implementation, the one or more actions may comprise backing up the robot a few inches if the front-mounted pressure sensor has been tripped.

Consider an example in which the pressure sensor 120 is configured with a first pressure threshold of about 5-10 pounds. In such an implementation, the pressure sensor may be described as "tripping" in response to a sensed pressure of about 5-10 pounds. Under such a condition, the controller 130 may generate a soft reset notification to cause the robot to enter a soft reset mode since the sensed pressure value is above the first pressure threshold. Under such a condition, the controller 130 may instruct the robot to operate in a soft reset mode since the sensed pressure value is above the first pressure threshold. In the soft reset mode, a remote guardian may review or access one or more robot status indicators and determine whether the robot can be brought back into service. In an implementation, the system is configured to instruct the robot to re-enter a normal operation mode in response to an indication received from a remote guardian or tele-operator. Such an approach advantageously avoids the need for an operator to physically be present at the robot to address the cause of the soft reset and bring the robot back into normal operation mode.

The controller 130 may be configured to generate a hard reset notification to cause the robot to enter a hard reset mode when the sensed pressure value is above the second pressure threshold. The hard reset mode may be advantageous in response to a higher sensed pressure value, for example a significant impact. While the sensed pressure value itself may be a concern, it may also be an indicator of another issue as a root cause. For example, if a malicious intruder has attempted to control software running on the robot, it may cause the robot to behave erratically and experience a sensed pressure that is above the second threshold. In such a case, the hard reset mode prevents further damage to, or by, the robot by restricting or preventing further movement.

In an example implementation, the second pressure threshold and the hard reset mode provide a mechanical way to stop the robot from moving, that is resistant to a hacking attempt, for example if a malicious hacker ran the robot into a pole, person, vehicle, etc. In other words, if the robot were somehow hacked and the robot ran into an obstacle, according to an embodiment of the present disclosure that would only happen done once, and then the mechanical emergency stop would be triggered by way of the second pressure threshold or the second pressure sensor.

Consider an example in which the pressure sensor 120 is configured with a second pressure threshold of about 20 pounds. In such an implementation, the pressure sensor may be described as "tripping" in response to a sensed pressure of about 20 pounds or more. Under such a condition, the controller 130 may generate a hard reset notification to cause the robot to enter a hard reset mode since the sensed pressure value is above the second pressure threshold. Under such a condition, the controller 130 may instruct the robot to operate in a hard reset mode since the sensed pressure value is above the second pressure threshold. In the hard reset mode, remote guardian or tele-operator access to the robot is restricted, or in some cases prevented entirely. This helps to protect the robot from hackers or adversaries trying to control the robot, for example by requiring an operator to physically be present at the robot to address the cause of the hard reset, as opposed to the soft reset condition in which remote guardian or tele-operator access is enabled while robot movement is restricted or prevented.

The controller 130 may be configured to prevent robot movement and to prevent remote guardian access to the robot in the hard reset mode. The controller 130 may be configured to cause the robot to enter the hard reset mode in which robot movement is restricted and remote guardian access to the robot is restricted when the sensed pressure value is above the second pressure threshold. The controller 130 may be configured to cause the robot to enter the hard reset mode in which robot movement is prevented and remote guardian access to the robot is prevented.

In an example embodiment, the controller 130 may comprise one or more processors 132, and electronic storage 136, such as a non-transient computer-readable storage medium having machine-readable instructions 134 embodied thereon. The one or more processors 132 may be configured to execute the instructions 134 to: obtain, from the pressure sensor, the sensed pressure value relating to pressure applied to the robot at the pressure sensor; generate the soft reset notification to cause the robot to enter the soft reset mode when the sensed pressure value is above the first pressure threshold; and generate the hard reset notification to cause the robot to enter the hard reset mode when the sensed pressure value is above the second pressure threshold.

In an example embodiment, the pressure sensor 120 comprises a first sensing edge 122 operating with respect to the first pressure threshold, and a second sensing edge 124 operating with respect to the second pressure threshold. The first and second sensing edges 122 and 124 may be a safety edge, for example a contact device that operates when touched using pressure sensitive sensors, to provide a signal to stop/reverse operations if an obstacle is encountered. While sensing edges may be employed in other implementations to stop/reverse operations, for example with respect to an elevator door or a garage door, in an example embodiment the first and second sensing edges 122 and 124 are configured to assist the system 100 to instruct the robot to operate in a soft reset mode or in a hard reset mode, rather than simply temporarily halting or reversing operation. The first and second sensing edges 122 and 124 may be mounted on an edge surface of a robot, for example on a bumper or extremity of the robot. The first and second sensing edges 122 and 124 may be mounted on a robot peripheral, accessory or robotic attachment configured for operation with the robot.

The controller 130 may be configured to generate the soft reset notification to cause the robot to enter the soft reset mode when the sensed pressure value is above the first pressure threshold of the first sensing edge. The controller 130 may be configured to generate the hard reset notification to cause the robot to enter the hard reset mode when the sensed pressure value is above the second pressure threshold of the second sensing edge.

In another embodiment, a robot control and sensing system is configured to instruct the robot to operate in a soft reset mode or in a hard reset mode based on sensed pressure. The robot control and sensor system 100 may comprise a pressure sensor 120 configured to be mounted to a robot 110 and to measure a sensed pressure value at the robot. The pressure sensor 120 may operate with respect to a first pressure threshold and with respect to a second pressure threshold, the second pressure threshold being higher than the first pressure threshold. A controller 130 may be in communication with the pressure sensor 120 and configured to instruct the robot 110 to operate in a soft reset mode in which robot movement is restricted when the sensed pressure value is above the first pressure threshold. The controller 130 may be configured to instruct the robot 110 to operate in a hard reset mode in which robot movement is restricted and remote guardian access to the robot is restricted when the sensed pressure value is above the second pressure threshold.

In a further embodiment, the present disclosure provides a robot 110 comprising the robot control and sensor system 120 as described and illustrated herein, as well as a robot body operable in a normal operating mode, in the soft reset mode and in the hard reset mode.

Figure 2:
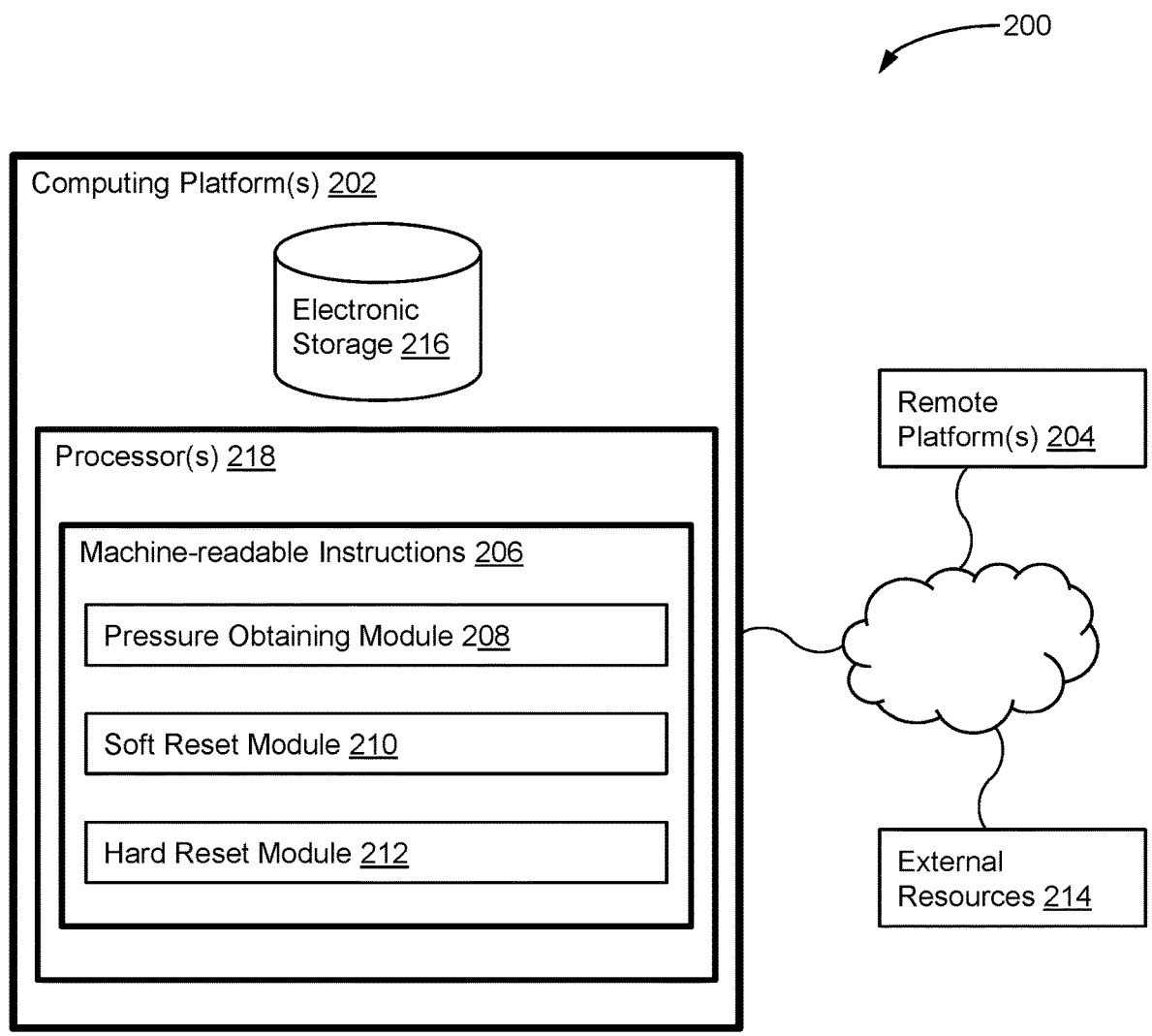
FIG. 2 illustrates another robot control and sensor system, in accordance with one or more embodiments.

FIG. 2 illustrates a robot control and sensor system 200, in accordance with one or more embodiments. In some embodiments, system 200 may include one or more computing platforms 202. Computing platform(s) 202 may be configured to communicate with one or more remote platforms 204 according to a client/server architecture, a peer-to-peer architecture, and/or other architectures. Remote platform(s) 204 may be configured to communicate with other remote platforms via computing platform(s) 202 and/or according to a client/server architecture, a peer-to-peer architecture, and/or other architectures. Users may access system 200 via remote platform(s) 204.

Computing platform(s) 202 may be configured by machine-readable instructions 206. Machine-readable instructions 206 may include one or more instruction modules. The instruction modules may include computer program modules. The instruction modules may include one or more of pressure obtaining module 208, soft reset module 210, hard reset module 212, and/or other instruction modules.

Pressure obtaining module 208 may be configured to obtain, from a pressure sensor mounted to the robot and/or from a pressure sensor mounted to one or more robot peripherals, a sensed pressure value relating to pressure applied to the robot at the pressure sensor. The pressure obtaining module 208 may operate with respect to a first pressure threshold and with respect to a second pressure threshold. The second pressure threshold may be higher than the first pressure threshold.

Soft reset module 210 may be configured to generate a soft reset notification to cause the robot to enter a soft reset mode when the sensed pressure value is above a first pressure threshold. Soft reset module 210 may be configured to restrict robot movement in the soft reset mode, optionally permitting only certain minor movements. Soft reset module 210 may be configured to prevent robot movement in the soft reset mode. Soft reset module 210 may be configured to cause the robot to enter the soft reset mode in which robot movement is restricted and remote guardian access to the robot is enabled when the sensed pressure value is above the first pressure threshold.

Hard reset module 212 may be configured to generate a hard reset notification to cause the robot to enter a hard reset mode when the sensed pressure value is above a second pressure threshold. The second pressure threshold may be higher than the first pressure threshold. Hard reset module 212 may be configured to prevent robot movement and prevent remote guardian access to the robot in the hard reset mode. Hard reset module 212 may be configured to cause the robot to enter the hard reset mode in which robot movement is restricted and remote guardian access to the robot is restricted when the sensed pressure value is above the second pressure threshold.

In some embodiments, computing platform(s) 202, remote platform(s) 204, and/or external resources 214 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 202, remote platform(s) 204, and/or external resources 214 may be operatively linked via some other communication media.

A given remote platform 204 may include one or more processors configured to execute computer program modules. The computer program modules may be configured to enable an expert or user associated with the given remote platform 204 to interface with system 200 and/or external resources 214, and/or provide other functionality attributed herein to remote platform(s) 204. By way of non-limiting example, a given remote platform 204 and/or a given computing platform 202 may include one or more of a server, a desktop computer, a laptop computer, a handheld computer, a tablet computing platform, a NetBook, a Smartphone, a gaming console, and/or other computing platforms.

In an example embodiment, computing platform(s) 202 according to the present disclosure may provide a device interface, or computer interface. External resources 214 may include sources of information outside of system 200, external entities participating with system 200, and/or other resources. In some embodiments, some or all of the functionality attributed herein to external resources 214 may be provided by resources included in system 200.

Computing platform(s) 202 may include electronic storage 216, one or more processors 218, and/or other components. Computing platform(s) 202 may include communication lines, or ports to enable the exchange of information with a network and/or other computing platforms. Illustration of computing platform(s) 202 in FIG. 2 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 216 may comprise non-transitory storage media that electronically stores information. The electronic storage media of electronic storage 216 may include one or both of system storage that is provided integrally (i.e., substantially non-removable) with computing platform(s) 202 and/or removable storage that is removably connectable to computing platform(s) 202 via, for example, a port (e.g., a USB port, a firewire port, etc.) or a drive (e.g., a disk drive, etc.). Electronic storage 216 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 216 may include one or more virtual storage resources (e.g., cloud storage, a virtual private network, and/or other virtual storage resources). Electronic storage 216 may store software algorithms, information determined by processor(s) 218, information received from computing platform(s) 202, information received from remote platform(s) 204, and/or other information that enables computing platform(s) 202 to function as described herein.

Processor(s) 218 may be configured to provide information processing capabilities in computing platform(s) 202. As such, processor(s) 218 may include one or more of a digital processor, an analog processor, a digital circuit designed to process information, an analog circuit designed to process information, a state machine, and/or other mechanisms for electronically processing information. Although processor(s) 218 is shown in FIG. 2 as a single entity, this is for illustrative purposes only. In some embodiments, processor(s) 218 may include a plurality of processing units. These processing units may be physically located within the same device, or processor(s) 218 may represent processing functionality of a plurality of devices operating in coordination. Processor(s) 218 may be configured to execute modules 208, 210, and/or 212, and/or other modules. Processor(s) 218 may be configured to execute modules 208, 210, and/or 212, and/or other modules by software; hardware; firmware; some combination of software, hardware, and/or firmware; and/or other mechanisms for configuring processing capabilities on processor(s) 218. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 208, 210, and/or 212, are illustrated in FIG. 2 as being implemented within a single processing unit, in embodiments in which processor(s) 218 includes multiple processing units, one or more of modules 208, 210, and/or 212 may be implemented remotely from the other modules. The description of the functionality provided by the different modules 208, 210 and/or 212 described below is for illustrative purposes, and is not intended to be limiting, as any of modules 208, 210 and/or 212 may provide more or less functionality than is described. For example, one or more of modules 208, 210 and/or 212 may be eliminated, and some or all of its functionality may be provided by other ones of modules 208, 210 and/or 212. As another example, processor(s) 218 may be configured to execute one or more additional modules that may perform some or all of the functionality attributed below to one of modules 208, 210 and/or 212.

Figure 3:
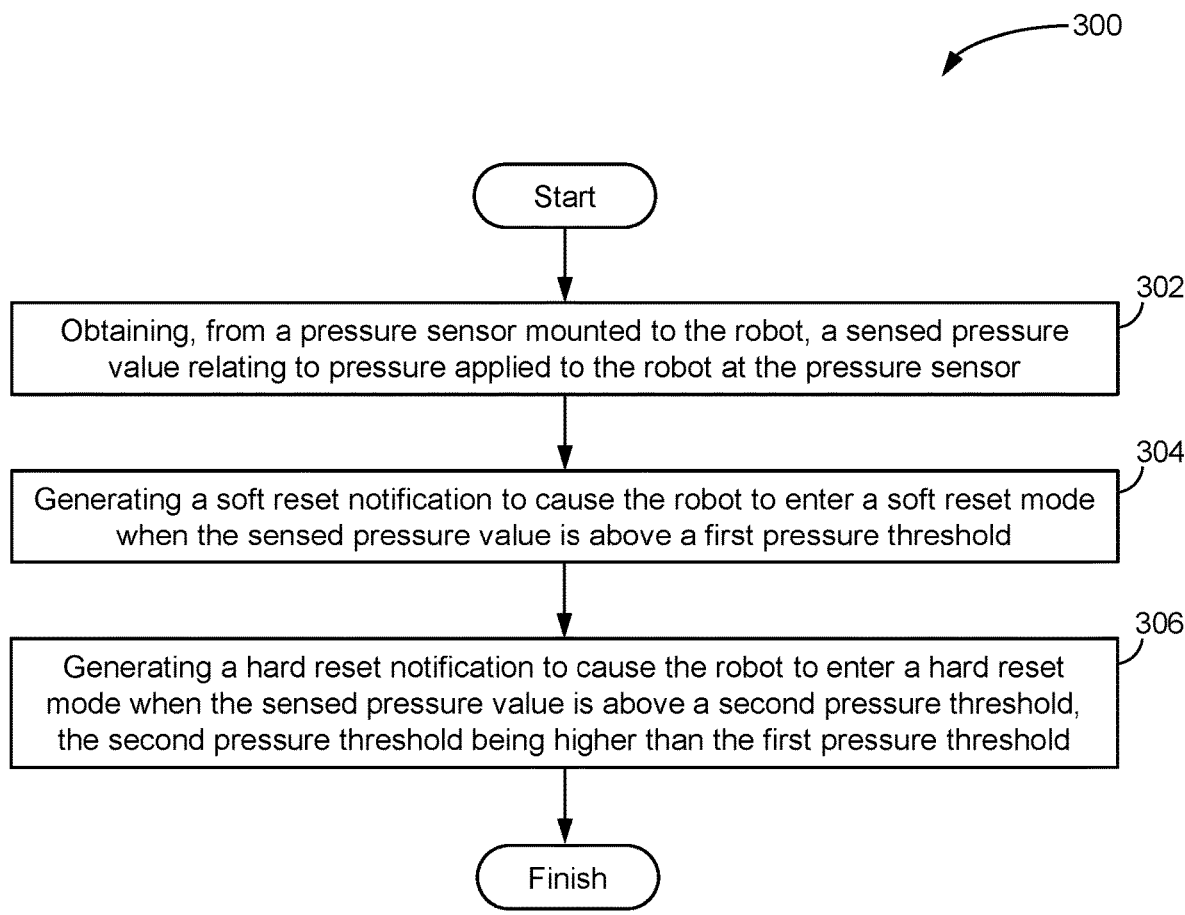
FIG. 3 illustrates a method for controlling a robot, in accordance with one or more embodiments.

FIG. 3 illustrates a method 300 for measuring skin sensitivity using a mobile device, in accordance with one or more embodiments. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include obtaining, from a pressure sensor mounted to the robot, a sensed pressure value relating to pressure applied to the robot at the pressure sensor. Operation 302 may be performed by one or more hardware processors configured by machine-readable instructions including a module that is the same as or similar to pressure obtaining module 208, in accordance with one or more embodiments.

An operation 304 may include generating a soft reset notification to cause the robot to enter a soft reset mode when the sensed pressure value is above a first pressure threshold. Operation 304 may be performed by one or more hardware processors configured by machine-readable instructions including a module that is the same as or similar to soft reset module 210, in accordance with one or more embodiments.

An operation 306 may include generating a hard reset notification to cause the robot to enter a hard reset mode when the sensed pressure value is above a second pressure threshold, the second pressure threshold being higher than the first pressure threshold. Operation 306 may be performed by one or more hardware processors configured by machine-readable instructions including a module that is the same as or similar to hard reset module 212, in accordance with one or more embodiments.

In another embodiment, the present disclosure provides a processor-implemented method for controlling a robot. The method may include obtaining, from a pressure sensor mounted to the robot, a sensed pressure value relating to pressure applied to the robot at the pressure sensor. The method may include instructing the robot to operate in a soft reset mode in which robot movement is restricted when the sensed pressure value is above a first pressure threshold. The method may include instructing the robot to operate in a hard reset mode in which robot movement is restricted and remote guardian access to the robot is restricted when the sensed pressure value is above a second pressure threshold, the second pressure threshold being higher than the first pressure threshold.

In a further embodiment, the present disclosure provides a non-transient computer-readable storage medium having instructions embodied thereon, the instructions being executable by one or more processors to perform a computer-implemented method for controlling a robot as both generally and specifically described and illustrated herein.

In a yet further embodiment, the present disclosure provides a computing platform configured for controlling a robot. The computing platform may include a non-transient computer-readable storage medium having instructions embodied thereon. The computing platform may include one or more processors configured to execute the instructions to perform a computer-implemented method for controlling a robot as both generally and specifically described and illustrated herein.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a compact disk read only memory (CD-ROM), digital versatile disk (DVD), Blu-ray Disc Read Only Memory (BD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

The invention claimed is:

1. A robot control and sensor system having a double sensing edge, the system comprising:
   a pressure sensor configured to be mounted on an autonomous robot or a robot peripheral and is configured to measure a sensed pressure value at the autonomous robot or the robot peripheral, the pressure sensor operating with respect to a first pressure threshold and with respect to a second pressure threshold, the second pressure threshold being higher than the first pressure threshold;
   a controller in communication with the pressure sensor and configured to:
      obtain, from the pressure sensor, a sensed pressure value relating to pressure applied to the robot at the pressure sensor;
      generate a soft reset notification to cause the robot to enter a soft reset mode when the sensed pressure value is above the first pressure threshold; and
      generate a hard reset notification to cause the robot to enter a hard reset mode when the sensed pressure value is above the second pressure threshold;
   wherein the pressure sensor further comprises a first sensing edge operating with respect to the first pressure threshold and a second sensing edge operating with respect to the second pressure threshold;
   wherein the autonomous robot or the robot peripheral further comprises a lawn cutting deck or a snow plow.

2. The system of claim 1, wherein the controller is configured to:
   generate the soft reset notification to cause the robot to enter the soft reset mode when the sensed pressure value is above the first pressure threshold of the first sensing edge; and
   generate the hard reset notification to cause the robot to enter the hard reset mode when the sensed pressure value is above the second pressure threshold of the second sensing edge.

3. The system of claim 1, wherein the controller is configured to:
   cause the robot to enter the soft reset mode in which robot movement is restricted and remote guardian access to the robot is enabled when the sensed pressure value is above the first pressure threshold.

4. The system of claim 3, wherein the controller is configured to:
   prevent robot movement in the soft reset mode.

5. The system of claim 1, wherein the controller is configured to:
   cause the robot to enter the hard reset mode in which robot movement is restricted and remote guardian access to the robot is restricted when the sensed pressure value is above the second pressure threshold.

6. The system of claim 5, wherein the controller is configured to:
   prevent robot movement and prevent remote guardian access to the robot in the hard reset mode.

7. The system of claim 5, wherein the controller comprises:
   a non-transient computer-readable storage medium having instructions embodied thereon, and one or more processors configured to execute the instructions to:
      obtain, from the pressure sensor, the sensed pressure value relating to pressure applied to the robot at the pressure sensor;
      generate the soft reset notification to cause the robot to enter the soft reset mode when the sensed pressure value is above the first pressure threshold; and
      generate the hard reset notification to cause the robot to enter the hard reset mode when the sensed pressure value is above the second pressure threshold.

8. A non-transient computer-readable storage medium having instructions embodied thereon, the instructions being executable by one or more processors to perform a computer-implemented method for controlling an autonomous robot, and having a double sensing edge, the computer-implemented method comprising:
   obtaining, from a pressure sensor mounted to the autonomous robot or a robot peripheral, a sensed pressure value relating to pressure applied to the autonomous robot at the pressure sensor;
   generating a soft reset notification to cause the autonomous robot to enter a soft reset mode when the sensed pressure value is above a first pressure threshold; and
   generating a hard reset notification to cause the autonomous robot to enter a hard reset mode when the sensed pressure value is above a second pressure threshold, the second pressure threshold being higher than the first pressure threshold;

wherein the pressure sensor further comprises a first sensing edge operating with respect to the first pressure threshold and a second sensing edge operating with respect to the second pressure threshold;

wherein the autonomous robot or robot peripheral further comprises a lawn cutting deck or a snow plow.

9. The computer-implemented method of claim 8 wherein the controller is further configured to generate the soft reset notification to cause the robot to enter the soft reset mode when the sensed pressure value is above the first pressure threshold of the first sensing edge and generate the hard reset notification to cause the robot to enter the hard reset mode when the sensed pressure value is above the second pressure threshold of the second sensing edge.

10. A robot control and sensor system having a double sensing edge, the system comprising:

a pressure sensor configured to be mounted to an autonomous robot or a robot peripheral and is configured to measure a sensed pressure value at the autonomous robot or the robot peripheral, the pressure sensor operating with respect to a first pressure threshold and with respect to a second pressure threshold, the second pressure threshold being higher than the first pressure threshold;

a controller in communication with the pressure sensor and configured to instruct the robot to operate in a soft reset mode in which robot movement is restricted when the sensed pressure value is above the first pressure threshold, and to operate in a hard reset mode in which robot movement is restricted and remote guardian access to the robot is restricted when the sensed pressure value is above the second pressure threshold;

wherein the pressure sensor further comprises a first sensing edge operating with respect to the first pressure threshold and a second sensing edge operating with respect to the second pressure threshold;

wherein the autonomous robot or robot peripheral further comprises a lawn cutting deck or a snow plow.

11. The robot control and sensor system of claim 10 wherein the controller is further configured to generate the soft reset notification to cause the robot to enter the soft reset mode when the sensed pressure value is above the first pressure threshold of the first sensing edge and generate the hard reset notification to cause the robot to enter the hard reset mode when the sensed pressure value is above the second pressure threshold of the second sensing edge.

* * * * *